July 28, 1953  S. SHALER  2,646,628
SPIRIT LEVEL AND PROCESS OF MAKING THE SAME
Filed June 25, 1951
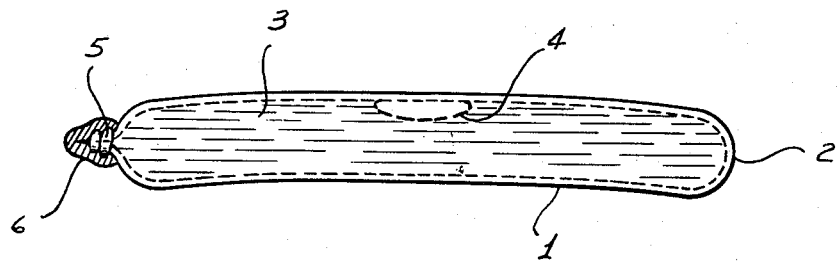
INVENTOR
SAUL SHALER
BY
ATTORNEY Patented July 28, 1953

2,646,628

UNITED STATES PATENT OFFICE 2,646,628

SPIRIT LEVEL AND PROCESS OF MAKING THE SAME

Saul Shaler, Jackson Heights, N. Y.

Application June 25, 1951, Serial No. 233,370

6 Claims. (Cl. 33—211)

This invention relates to spirit levels, wherein a bubble, contained within a transparent tube, serves to indicate the horizontal when the tube is held in a position wherein the bubble is opposite a graduation provided on or adjacent the tube. The tube is ordinarily mounted within a frame of one kind or another to permit it to be readily handled without breakage and provide an instrument for determining whether the surface or part to be tested is truly horizontal.

In the past it has been the practice to seal within a glass tube an appropriate liquid, such as alcohol and glycerine, usually with a little dye, so that the bubble in the tube may be more readily seen. However, the sealing of the tube, after the introduction of the liquid, has made it difficult to obtain a satisfactory seal, for this sealing of the tube has been accomplished by fusing its open end in a blow pipe flame. This operation elevates the temperature of the liquid in the tube and tends to place it under pressure as the tube is sealed, with the result that not infrequently pin holes are left in the seal through which the liquid will escape or evaporate. Spirit levels when incorporated into tools or instruments are expected to last indefinitely and if evaporation or leakage occurs, with consequent failure of such instruments to satisfactorily function over long periods, the goodwill of the user for the manufacturer is lost.

Many have attempted in various ways without success to overcome this difficulty which is practically universal, but I have at last succeeded in effectually solving the problem in a simple and expeditious manner. The tube is sealed in the presence of heat as by a blow pipe with an accompanying twist on the glass from which the tube is made, so as to produce on the end of the tube a twisted papilla. The tube is then permitted to cool and after it is cooled, there is applied over this papilla a coating of a material impervious to air, gas and liquid and of sufficient strong and tenacious character to withstand pressures which may be thereafter built up in the tube by changes in atmospheric temperatures. The purpose of applying this coating is to effectually enclose the papilla by a material which strongly adheres to the glass wall thereof, so that in the event the heat seal has not been entirely effective, the supplemental seal provided by the added material will preclude leakage of gases, vapor or liquid from the tube.

Features of the invention, other than those adverted to, will be apparent from the hereinafter detailed description and appended claims when read in conjunction with the accompanying drawing.

The accompanying drawing illustrates one practical embodiment of the invention, but the construction therein shown is to be understood as illustrative, only, and not as defining the limits of the invention.

In the drawing I have shown a side elevation of a spirit level tube, heat sealed at both ends and with a heat seal at the left hand end supplemented by a coating of sealing material in accordance with this invention, said coating material being shown in section.

In carrying out this invention, a glass tube 1 of curved elongated form is first closed and sealed at one end 2 in any appropriate manner. There is no difficulty in obtaining a satisfactory seal at this point for at that time there is no liquid in the tube and the end of the tube may be readily fused to closed position.

There is next introduced into the tube a quantity of liquid 3 necessary to provide the usual bubble 4. The other end of the tube is then closed by applying the flame of a blow pipe thereto while that end of the tube is fused, drawn to a point and twisted, as indicated at 5, in an attempt to form a permanent fused seal, impervious to liquid, gas and vapor.

During this last sealing operation, the adjacent wall of the tube becomes heated to some extent and tends to volatilize the liquid 3 in the tube, so that the formation of the heat seal at 5 must be accomplished against the pressure which is autogenously generated in the tube. A satisfactory seal may be accomplished but experience shows that in a great many cases, it is not so.

Thereafter, and while the tube is at substantially room temperature, there is applied over the papilla 5, a coating 6 of a supplementary sealing medium which will be strong and tenacious, impervious to liquid and gas, and well adapted to adhere to the glass papilla. The supplemental seal 6 should be applied with the tube and its contents at room temperature so that the pressure within the tube is in equilibrium with the pressure outside of the tube. When thus applying the supplemental seal, there are no unequal pressures set up on the opposite sides of the seal which would tend to interfere with its proper bonding to the glass throughout and its consequent proper sealing of the passage which would otherwise constitute a slow leak.

I have found that film forming materials, such as a heavy or high viscosity cellulosic lacquer or dope is highly efficient for this purpose. The well known "Duco Cement" has given good results, although any organic plastic which may be applied in liquid or semi-liquid form and which will harden or set in place after application will suffice, provided that it is not porous to the vapor or liquid in the tube. The supplemental sealing material 6 may be applied by brushing the same thereon or by dipping the end of the tube into a body of material. When such material has solidified or set on the tube as indicated, it will effectually anchor itself on the twists of papilla and also adhesively secure itself to the wall of the tube in a manner that will effectually seal any slight leakage voids that might be present in the glass heat seal. It is also found that a cellulosic coating over the papilla very definitely cushions and protects it against breakage due to shock or impact with extraneous objects.

In the manufacture of spirit levels in the manner described, I have incorporated them, after sealing as stated, into various instruments, usually by setting them in plaster of Paris contained in a cavity in the frame of the instrument. This permits of leveling of the tube with respect to the coordinated surface or surfaces of the instrument and a calibration of the tube or frame of the instrument to the true level by an appropriate line or scale in conjunction with which the position of the bubble 4 may be read to indicate a true level or plumb condition of the work or device to be tested.

The foregoing detailed description sets forth the invention in its preferred practical form, but the invention is to be understood as fully commensurate with the appended claims.

Having thus fully described the invention what I claim as new and desire to secure by Letters Patent is:

1. The herein described method of making a spirit level which comprises: introducing liquid into a spirit level tube closed at one end, then heat sealing the other end of the tube while drawing said end into contracted form to produce thereon a heat sealed papilla, thereafter permitting the tube and its contents to cool, and thereafter applying directly to the papilla a supplemental sealing material to close any leaks in the heat seal while said liquid, papilla, and sealing material are all at substantially room temperature.

2. Method according to claim 1, wherein the supplemental sealing material is a cellulosic film forming material.

3. Method according to claim 1, wherein the heated end of the tube is twisted during the heat sealing thereof to form thereon a twisted papilla.

4. Method according to claim 1, wherein the heated end of the tube is twisted during the heat sealing thereof to form thereon a twisted papilla and wherein the supplemental sealing material is a cellulosic film forming material.

5. A glass spirit level tube, one end of which is closed by a heat seal enclosed within a cellulosic cement.

6. A glass spirit level tube, one end of which is closed by a twisted heat sealed papilla enclosed with a cellulosic material directly adhering to the surface of the twisted papilla.

SAUL SHALER.

References Cited in the file of this patent

UNITED STATES PATENTS

| Number | Name | Date |
|---|---|---|
| 704,758 | Riley | July 15, 1902 |
| 1,384,062 | Hopple | July 12, 1921 |
| 1,752,112 | Severance et al. | Mar. 25, 1930 |
| 2,119,901 | Baiter | June 7, 1938 |
| 2,149,378 | Winslow | Mar. 7, 1939 |
| 2,258,408 | Cozzoil | Oct. 7, 1941 |
| 2,270,152 | Themak | Jan. 13, 1942 |
| 2,449,478 | Herzog | Sept. 14, 1948 |